(12) United States Patent
Lindgren et al.

(10) Patent No.: US 12,722,717 B2
(45) Date of Patent: Sep. 1, 2026

(54) METHOD FOR AUTOMATED ATTACHMENT OF INSULATING ELEMENTS TO STRUCTURAL ELEMENTS

(71) Applicant: SIKA TECHNOLOGY AG, Baar (CH)

(72) Inventors: Henrik Lindgren, Feluy (BE); Dimitri Marcq, Tubize (BE)

(73) Assignee: SIKA TECHNOLOGY AG, Baar (CH)

( * ) Notice: Subject to any disclaimer, the term of this patent is extended or adjusted under 35 U.S.C. 154(b) by 438 days.

(21) Appl. No.: 18/272,846

(22) PCT Filed: Mar. 25, 2022

(86) PCT No.: PCT/EP2022/058024
§ 371 (c)(1),
(2) Date: Jul. 18, 2023

(87) PCT Pub. No.: WO2022/207518
PCT Pub. Date: Oct. 6, 2022

(65) Prior Publication Data

US 2024/0300590 A1 Sep. 12, 2024

(30) Foreign Application Priority Data

Mar. 31, 2021 (EP) ..................................... 21166223

(51) Int. Cl.
*B62D 29/00* (2006.01)
*B25J 11/00* (2006.01)

(52) U.S. Cl.
CPC ........... *B62D 29/002* (2013.01); *B25J 11/005* (2013.01)

(58) Field of Classification Search
CPC ..... B62D 29/002; B62D 65/024; B25J 11/005
See application file for complete search history.

(56) References Cited

U.S. PATENT DOCUMENTS 5,266,133 A 11/1993 Hanley et al.
5,373,027 A 12/1994 Hanley et al.
(Continued)

FOREIGN PATENT DOCUMENTS

CN 101331029 A 12/2008
CN 208469702 U 2/2019
(Continued)

OTHER PUBLICATIONS

Pisla et al., nteractive Modelling of the Robotized Systems, 2006, IEEE, p. 1-5 (Year: 2006).*
(Continued)

*Primary Examiner* — Mcdieunel Marc
(74) *Attorney, Agent, or Firm* — Oliff PLC

(57) ABSTRACT

A method for the automated mounting of insulating elements on structural elements of motor vehicles includes the following steps: providing a plurality of insulating elements, wherein an insulating element in each case includes a carrier, an expandable material which is arranged on the carrier, and at least one fixing element for fixing the insulating element on the structural element; gripping individual insulating elements by a robot, wherein the robot is designed as a multi-axis robot with a gripper; and mounting in each case an insulating element on a structural element by the robot, wherein the at least one fixing element of the insulating element is inserted into an opening in the structural element.

15 Claims, 5 Drawing Sheets

(56) References Cited

U.S. PATENT DOCUMENTS

| | | | | |
|---|---|---|---|---|
| 6,387,470 | B1 | 5/2002 | Chang et al. | |
| 9,877,462 | B2 * | 1/2018 | Taneja | A01K 5/0291 |
| 9,981,382 | B1 * | 5/2018 | Strauss | B25J 9/1697 |
| 10,569,808 | B2 * | 2/2020 | Niggemann | B62D 25/02 |
| 10,906,595 | B2 * | 2/2021 | Belpaire | B62D 29/005 |
| 2008/0263834 | A1 | 10/2008 | Horimatsu et al. | |
| 2010/0092733 | A1 | 4/2010 | Blank et al. | |
| 2021/0069917 | A1 * | 3/2021 | Cloetingh | B25J 15/10 |

FOREIGN PATENT DOCUMENTS

| | | | |
|---|---|---|---|
| DE | 10237776 | B4 | 11/2004 |
| DE | 10 2006 032 480 | A1 | 1/2008 |
| EP | 0 204 970 | A2 | 12/1986 |
| EP | 3 747 739 | A1 | 12/2020 |
| JP | S60143686 | U | 9/1985 |
| JP | 2004004445 | A | 1/2004 |
| WO | 2005/080524 | A1 | 9/2005 |
| WO | 2020245286 | A1 | 12/2020 |
| WO | 2021/069120 | A1 | 4/2021 |

OTHER PUBLICATIONS

Schaler et al., An electrostatic gripper for flexible objects, 2017, IEEE, pg., (Year: 2017).*

Langford et al., Hierarchical assembly of a self-replicating spacecraft, 2017, IEEE, pg., (Year: 2017).*

Kordi et al., Development of a multifunctional robot end-effector system for automated manufacture of textile preforms, 2007, IEEE, p. 1-6 (Year: 2007).*

Jul. 13, 2022 Search Report issued in International Patent Application No. PCT/EP2022/058024.

Oct. 3, 2023 International Preliminary Report on Patentability issued in International Patent Application No. PCT/EP2022/058024.

Translation of Feb. 10, 2026 Office Action issued in Japanese Patent Application No. 2023-544121.

May 21, 2026 Office Action issued in Chinese Patent Application No. 20228005257.7.

* cited by examiner

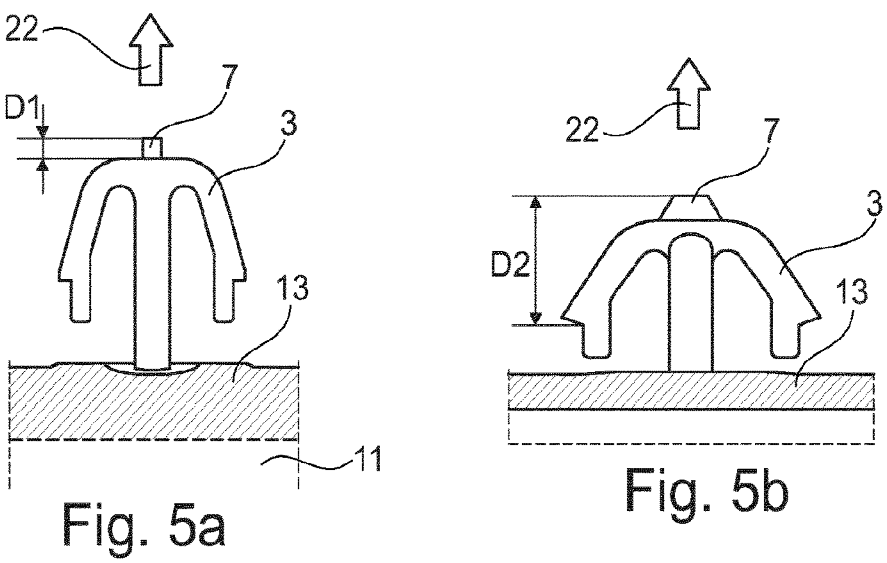
Fig. 5a
Fig. 5b
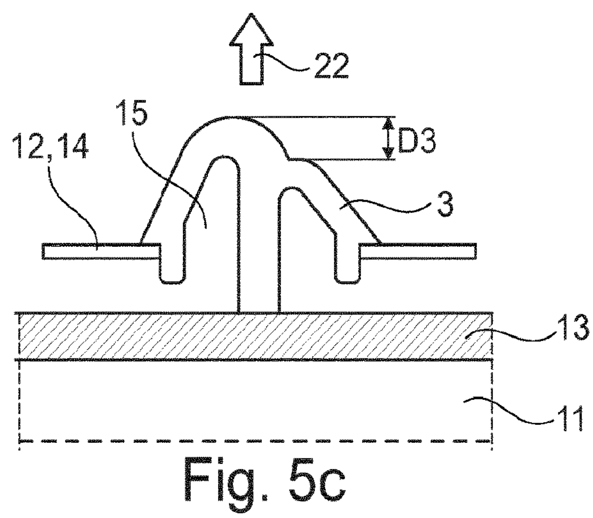
Fig. 5c
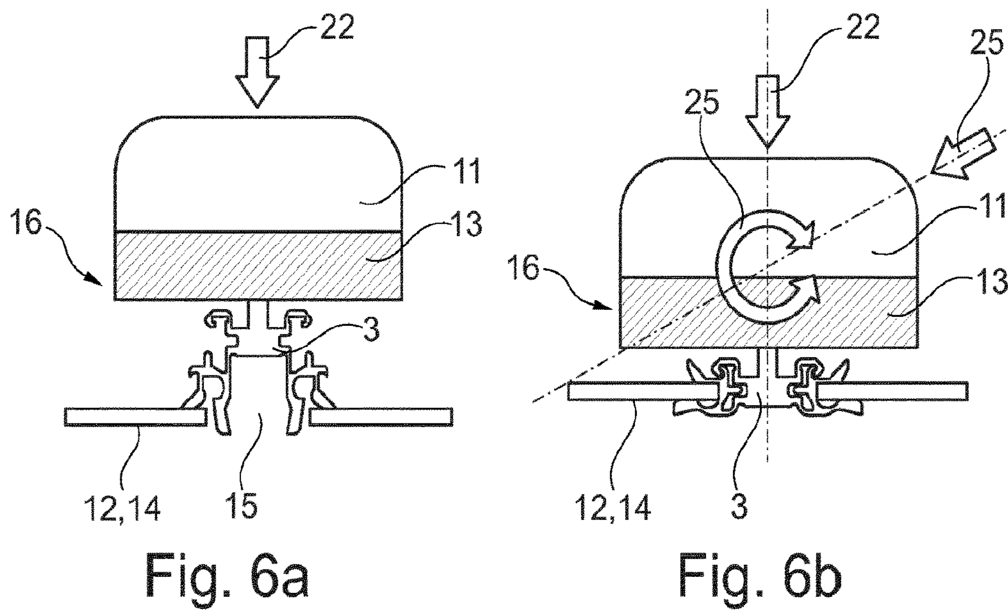
Fig. 6a
Fig. 6b

METHOD FOR AUTOMATED ATTACHMENT OF INSULATING ELEMENTS TO STRUCTURAL ELEMENTS

TECHNICAL FIELD

The invention relates to a method for the automated mounting of insulating elements on structural elements of motor vehicles, and to insulating elements for such a method.

BACKGROUND

In many cases, components such as, for example, vehicle bodies and/or frames of means of transport and locomotion, especially of water or land vehicles or of aircraft, have structures with cavities in order to enable lightweight constructions. However, these cavities cause a wide variety of problems. Depending on the type of the cavity, the latter has to be sealed in order to prevent the ingress of moisture and soiling, which can lead to corrosion of the components. It is often also desirable to substantially reinforce the cavities and hence the component, but to maintain the low weight. It is often also necessary to stabilize the cavities and hence the components, in order to reduce noise which would otherwise be transmitted along or through the cavity. Many of these cavities have an irregular shape or a narrow extent, which makes it more difficult to seal, reinforce and insulate them properly.

Especially in automotive construction, but also in aircraft construction and boatbuilding, sealing elements (baffles) are therefore used in order to seal and/or acoustically insulate cavities, or reinforcing elements (reinforcers) are used in order to reinforce cavities.

FIG. 1 schematically illustrates a body of an automobile. The vehicle body 10 here has various structures with cavities, such as, for example, pillars 14 and beams or struts 12. Such structural elements 12, 14 with cavities are typically sealed or reinforced with insulating elements 16.

Typically, such insulating elements 16 are mounted manually on the structural elements 12, 14. A disadvantage of this known manual method, however, is that it requires a lot of work and that this manual work is often difficult to carry out from an ergonomic point of view. In addition, owing to the manual mounting, there is a risk that insulating elements are mounted at unintended positions, and also that incorrect insulating elements are mounted at a position of a structural element.

It is therefore an object of the present invention to provide an improved method for mounting insulating elements on structural elements in a motor vehicle that avoids the disadvantages of the prior art. In particular, the method should be more economical, avoid ergonomically unfavorable workplaces and, as far as possible, prevent the risk of faulty installations.

SUMMARY

This object is initially achieved by a method for the automated mounting of insulating elements on structural elements of motor vehicles, the method comprising the steps of:

providing a plurality of insulating elements, wherein an insulating element in each case comprises a carrier, an expandable material which is arranged on the carrier, and at least one fixing element for fixing the insulating element to the structural element; gripping individual insulating elements by a robot, wherein the robot is designed as a multi-axis robot with a gripper; and mounting in each case an insulating element on a structural element by the robot, wherein the at least one fixing element of the insulating element is inserted into an opening in the structural element.

First of all, this solution has the advantage that it allows insulating elements to be mounted on structural elements using an automated method. As a result, considerable costs can be saved, which are incurred when the insulating elements are applied manually. In addition, incorrect manipulations, which occasionally occur with manual applications, can also be ruled out by such an automated operation.

The method proposed here also offers the advantage that the insulating elements themselves can be designed differently as a result of the automated mounting of the insulating elements. In particular, in the case of manual application, the insulating elements must be designed in such a way that they can be easily mounted by hand. This requires, for example, a special adaptation of fixing elements, so that an expenditure of force required to mount the insulating elements on structural elements does not exceed a certain value for ergonomic reasons. By automating this mounting operation as proposed here, the insulating elements and in particular the fixing elements of the insulating elements can now be redesigned. In particular, the fixing elements can be designed in such a way that a higher level of force can also be used. This makes it possible, for example, to use more favorable or more robust materials for the fixing element.

Furthermore, the insulating elements for manual mounting often have to have special features so that incorrectly oriented alignment on the structural element during mounting is impossible. This can be achieved, for example, by a poka-yoke design of the fixing elements, which, however, increases the costs for such insulating elements. Such special features can be avoided by the automated mounting method proposed here, so that more favorable insulating elements can be used as a result.

BRIEF DESCRIPTION OF THE DRAWINGS

Details and advantages of the invention will be described hereinafter using exemplary embodiments and with reference to schematic drawings, in which:

FIGS. 5*a* to 5*c* show schematic representations of exemplary fixing elements;

FIGS. 6*a* and 6*b* show a schematic representation of an exemplary automated mounting operation.

DETAILED DESCRIPTION

Figure 1:
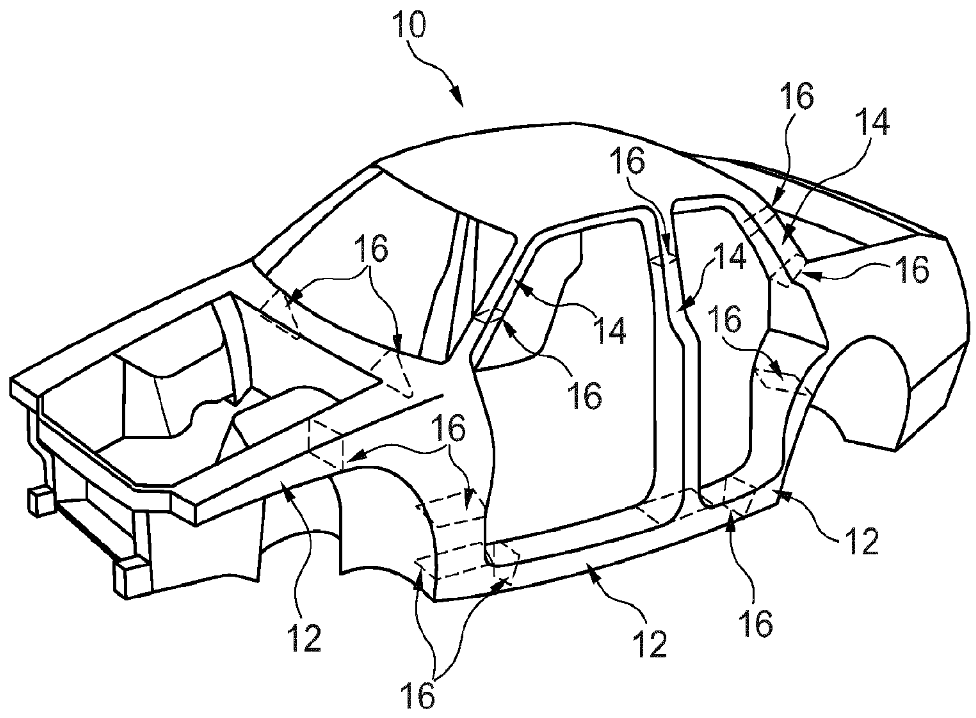
FIG. 1 shows an exemplary representation of a vehicle body.

In the context of this invention, the term "insulating element" includes elements for partitioning off and/or sealing off and/or damping and/or closing and/or reinforcing and/or insulating a structural element. These various characteristics of such an insulating element can arise individually or in combination with one another.

In the context of this invention, the terms "top side" and "bottom side" each mean the two main surfaces or the two largest surfaces of the insulating element. Since the insulating elements are designed to close a cross section in a structural element, this means that the top side and the bottom side are each substantially in a plane of a cross section to be sealed off in a state of use. In this respect, the top side and/or the bottom side may also have a step-shaped character, that is to say it is not necessary for the top side and/or the bottom side to have a completely flat form.

In one exemplary embodiment, the insulating elements are provided in a stack when they are provided, with all the insulating elements stacked on top of one another being oriented substantially identically in space.

The provision of the insulating elements in the form of stacks has the particular advantage that a position of the fixing elements is predefined as a result. This means that the robot can pick up insulating elements in a predefined way without having to ensure correct orientation of the insulating elements through additional work steps.

Such insulating elements can already be stacked on top of one another for transport, so that they are packaged and transported in the stacked state. This firstly saves on transport costs because it allows the insulating elements to be packed in a more space-saving manner, with the result that in a given volume more insulating elements can be transported than was the case with conventional insulating elements.

In addition, stacking such insulating elements offers the advantage that confusion between different insulating elements can be identified more easily. If, for example, a first insulating element is packed in a container with a plurality of second insulating elements, this is immediately noticeable because the first insulating element generally cannot be stacked with the second insulating elements. This makes it possible to greatly reduce confusion.

Furthermore, the individual insulating elements can be damaged less easily due to the stacked arrangement for transport and storage. Specifically, if the individual insulating elements are transported loosely in a container as before, the insulating elements will repeatedly come into contact with one another, and damage can occur from time to time. However, if the insulating elements are transported in stacks, the number of times the insulating elements make mechanical contact with one another is greatly reduced. In addition, the insulating elements may be configured in such a way that the intended locations of contact have a robust form and/or one that is less prone to damage, and/or that locations of the insulating elements that are easier to damage are arranged at protected points which, for example, are covered by the adjacent insulating elements when stacked.

In particular, by providing insulating elements in a stacked form, the entire system can be loaded and prepared so that it can work autonomously for longer periods of time. Since it is generally the case that many insulating elements of this kind are installed per motor vehicle, this means a major saving of human labour.

Stacking also offers the particular advantage that automation can be configured much more efficiently and cost-effectively. For example, the robot can be designed to be less complex than when a robot has to grip insulating elements in a disordered state. By providing them in stacks, the gripping operation of the insulating elements by the robot can be simplified and made more efficient as a result.

In one exemplary embodiment, the insulating element has a top side and a bottom side which, in a state of use, are aligned substantially in a plane of a cross section of the structural element that is to be sealed off.

In one exemplary embodiment, the insulating element has at least one or at least two or at least three contact sites on each of the top side and the bottom side, where these contact sites are designed in such a way that, when a plurality of identical insulating elements are stacked, adjacent insulating elements respectively lie against one another via these contact sites and are thus arranged parallel to one another.

In one exemplary embodiment, the insulating element has at least one or more contact sites on each of the top side and the bottom side, which rest on one another when adjacent insulating elements are stacked.

The insulating element has a stack height which corresponds to an additional height in the stacking direction of a stack having insulating elements by which the stack grows when a further insulating element is stacked onto the stack.

In one exemplary embodiment, a stack height of the insulating element is at most 80%, preferably at most 70%, preferably at most 60%, preferably at most 50%, preferably at most 40%, preferably at most 30%, of a total height of an individual insulating element in the stacking direction.

This has the advantage that it allows the insulating elements to be arranged in a stack in a more space-saving manner. A greater degree of vertical nesting of adjacent insulating elements in a stack additionally improves the stability of the overall stack.

In one exemplary embodiment, a stack comprises at least ten or at least fifteen or at least twenty or at least twenty-five or at least thirty stacked insulating elements.

In a further exemplary embodiment, a stack comprises at most 150 or at most 120 or at most 100 or at most 80 or at most 60 stacked insulating elements.

In one exemplary embodiment, a lowermost insulating element of the stack lies on a base element.

The provision of such a base element firstly has the advantage that it allows a stack of insulating elements to be placed on a surface, especially without the stack falling over.

In one exemplary development, the base element is designed such that the stack is arranged thereon in such a way that the stacking direction is substantially vertical.

In one exemplary embodiment, the base element has a relief-like design, where a correspondingly shaped depression is formed for each stack on a surface of the base element. However, such base elements may also be formed differently; for example, a flat base plate may be provided, on which various support elements such as columns, elevations or the like are provided, which position, align and support the stacks at a predefined position.

The provision of such preformed base elements has the advantage that on the one hand a support or an orientation of the stack can thereby be improved and that on the other hand a positioning of the stack on the base element can also be predefined.

For automated processes, it is often important that spatial positions of elements that are manipulated by robots are exactly defined. Such a predefined positioning of the stack on the base elements can be achieved by a suitable selection of such formations.

In one exemplary development, the base element comprises a plurality of formations for positioning the insulating elements.

In one exemplary development, a first formation is designed to accommodate a stack of a first insulating element type, and at least one further formation on the same base element is designed to accommodate a stack of the same insulating element type.

In an alternative development, the base element in turn comprises a plurality of formations, where a first formation is designed to accommodate a stack of a first insulating element type, and where at least one further formation on the same base element is designed to accommodate a stack of a different insulating element type.

This accordingly allows multiple stacks either of the same type of insulating element or different types of insulating element to be arranged in a predefined manner on the same base element.

In one exemplary embodiment, the base element is designed as a tray or as a blister.

In one exemplary embodiment, the robot moves the insulating element in only one application direction when inserting the fixing element into the opening.

In one exemplary development, the robot moves the insulating element substantially perpendicularly to a surface of the structural element in a region of the opening.

In an alternative development, the robot moves the insulating element in a direction that is inclined to a perpendicular to a surface of the structural element in a region of the opening.

In a further alternative development, the robot moves the insulating element in an arcuate or circular manner.

In an alternative exemplary embodiment, the robot moves the insulating element in at least two application directions when inserting the fixing element into the opening.

In one exemplary development, the robot moves the insulating element in a first direction, which is inclined to a perpendicular to a surface of the structural element in a region of the opening, and additionally in a second direction, which is also inclined to a perpendicular to a surface of the structural element in a region of the opening.

Preferably, the first direction and the second direction are inclined on different sides of the vertical, in particular on opposite sides.

In a further exemplary development, the robot moves the insulating element in a rocking motion back and forth.

In a further exemplary development, the robot moves the insulating element in a circular motion around the vertical.

In one exemplary embodiment, the method comprises the further step of: testing correct mounting of the insulating element on the structural element.

In one exemplary development, the mounting is tested by a sensor, which is preferably arranged in the region of the gripper on the robot, being used for testing.

The sensor can be designed as an optical sensor, for example.

In an alternative exemplary development, the mounting is tested by the robot loading the insulating element in at least one testing direction, which is inclined by at least 45° from an application direction.

In an exemplary alternative embodiment, correct mounting of the insulating element on the structural element is checked by the robot loading the insulating element in at least one testing direction, which substantially corresponds to a direction of rotation of the insulating element.

In one exemplary development, the robot loads the insulating element during testing in at least two different testing directions.

The above-described loading of the insulating elements to check correct mounting of the insulating element on the structural element has the advantage that correct mounting can thereby be ensured with a simple process step. Correct fixing of the insulating element can be ensured in particular by means of a check in which the load is applied in at least two different testing directions.

In one exemplary embodiment, a force of at least 5 N, preferably at least 10 N, preferably at least 30 N, particularly preferably at least 50 N, is applied to the mounted insulating element during testing.

In one exemplary embodiment, a force of at most 200 N, preferably at most 180 N, preferably at most 160 N, particularly preferably at most 140 N, is applied by the robot to the mounted insulating element during testing.

In one exemplary embodiment, the method comprises the further step of: sorting out the insulating element if the insulating element is detached from the structural element during testing.

In one exemplary development, the method comprises the further step of: interrupting the automated operation if three or more insulating elements out of ten insulating elements mounted one after the other are each detached from the structural element during testing.

Such and similar measures have the advantage that an incorrect setting of the system and/or defective parts can be identified and rectified at an early stage.

In one exemplary embodiment, the robot applies a force of at least 70 N, preferably at least 80 N, preferably at least 90 N, particularly preferably at least 100 N, to the fixing element during mounting.

The application of such forces to the fixing element by the robot has the advantage that the fixing elements themselves can be designed differently than in the known prior art. For example, other materials can be used for the fixing element, or the fixing element can have a different shape which requires a greater use of force for mounting. As a result, the fixing elements can be designed to be more robust overall, so that damage to the fixing elements during production and transport of the insulating elements can be largely avoided.

In one exemplary embodiment, the method comprises the further step of:

coating the structural element after the insulating element has been mounted on the structural element and before the expandable material expands.

In one exemplary embodiment, the method comprises the further step of:

expanding the expandable material, wherein the expanded material permanently fastens the insulating element in the structural element, so that the fixing element is only used for a temporary pre-fixing of the insulating element in the structural element.

In one exemplary development, an expansion of the expandable material is triggered by a temperature of at least 120° C.

The object mentioned at the outset is also achieved by an insulating element for sealing off a structural element in a motor vehicle, the insulating element comprising: a carrier; an expandable material which is arranged on the carrier; and at least one fixing element for fixing the insulating element on the structural element; wherein the insulating element is designed for automated mounting as described above.

In one exemplary embodiment, the fixing element has a guide element, which is designed as an extension at one end of the fixing element in an intended application direction.

The provision of such guide elements offers the advantage that it simplifies the insertion of the fixing element into an opening in the structural element. By using a suitable guide element, the opening can be targeted by the robot with larger tolerances. The guide element guides the insulating element to the intended position during the mounting operation.

In one exemplary embodiment, the guide element is designed as a cylinder, a cone, a pyramid or a truncated cone.

In one exemplary embodiment, the guide element has a height in the application direction of between 0.5 and 5 mm, preferably between 1 and 4 mm.

In one exemplary embodiment, the insulating element comprises at least two fixing elements, with at least one of these fixing elements being designed as a fastening clip with a snap closure.

In one exemplary embodiment, a fixing element of the insulating element is designed as a single-stage snap closure or as a two-stage snap closure.

In one exemplary embodiment, a height of the fixing element in the application direction, which increases over the structural element in a mounted state, is at most 5 mm.

The provision of such short fixing elements offers the advantage that little space is taken up by the fixing element on a rear side of the structural element. The space conditions in vehicle bodies are often very limited, so that low structural heights of such elements are often desirable. However, such short structural heights are often associated with greater expenditure of force for mounting. However, with the here proposed automation of the mounting by a robot, such short fixing elements can now be realized, since the application of greater force has become possible during mounting by the robot because ergonomic aspects (as with the manual application) no longer play a role.

In one exemplary embodiment, the fixing element is designed asymmetrically, with a first half of the fixing element being designed to be higher in the application direction by a height difference of at least 1 mm, preferably at least 2 mm, particularly preferably at least 3 mm, than a second half of the fixing element.

Such an asymmetrically designed fixing element has the advantage that, similar to the provision of guide elements, an insertion aid can be ensured thereby which makes the automatic mounting operation less susceptible to incorrect manipulations.

The expandable material used may in principle be various materials that can be made to foam. This material may or may not have reinforcing properties. Typically, the expandable material is made to expand thermally, by moisture or by electromagnetic radiation.

Such an expandable material typically has a chemical or a physical blowing agent. Chemical blowing agents are organic or inorganic compounds which decompose under the influence of temperature, moisture or electromagnetic radiation, wherein at least one of the decomposition products is a gas. Physical blowing agents used may, for example, be compounds that are converted to the gaseous state of matter with increasing temperature. As a result, both chemical and physical blowing agents are capable of creating foam structures in polymers.

The expandable material is preferably foamed thermally, with chemical blowing agents being used. Examples of suitable chemical blowing agents are azodicarbonamides, sulfohydrazides, hydrogencarbonates or carbonates.

Suitable blowing agents are, for example, also commercially available under the trade name Expancel® from Akzo Nobel, the Netherlands, or under the trade name Celogen® from Chemtura Corp., USA.

The heat required for the foaming can be introduced by external or by internal heat sources, such as an exothermic chemical reaction. The foamable material is preferably foamable at a temperature of ≤250° C., especially of 100° C. to 250° C., preferably of 120° C. to 240° C., preferably of 130° C. to 230° C.

Suitable expandable materials are, for example, one-component epoxy resin systems which do not flow at room temperature and in particular have elevated impact resistance and contain thixotropic agents such as aerosils or nanoclays. For example, epoxy resin systems of this type include 20% to 50% by weight of a liquid epoxy resin, 0% to 30% by weight of a solid epoxy resin, 5% to 30% by weight of impact modifiers, 1% to 5% by weight of physical or chemical blowing agents, 10% to 40% by weight of fillers, 1% to 10% by weight of thixotropic agents and 2% to 10% by weight of heat-activatable curing agents. Suitable impact modifiers are reactive liquid rubbers based on nitrile rubber or derivatives of polyether polyol polyurethanes, core-shell polymers and similar systems known to a person skilled in the art.

Likewise suitable expandable materials are one-component polyurethane compositions containing blowing agents and based on crystalline polyesters which have OH groups and have been mixed with further polyols, preferably polyether polyols, and polyisocyanates with blocked isocyanate groups. The melting point of the crystalline polyester should be ≥50° C.

The isocyanate groups of the polyisocyanate may be blocked, for example, by nucleophiles such as caprolactam, phenols or benzoxalones. Also suitable are blocked polyisocyanates as used, for example, in powder-coating technology, and commercially available, for example, under the Vestagon® BF 1350 and Vestagon® BF 1540 trade names from Degussa GmbH, Germany. Suitable isocyanates are also what are called encapsulated or surface-deactivated polyisocyanates, which are known to a person skilled in the art and are described, for example, in EP 0 204 970.

Also suitable as expandable materials are two-component epoxy/polyurethane compositions which contain blowing agents, as described, for example, in WO 2005/080524 A1.

Also suitable as expandable materials are ethylene-vinyl acetate compositions containing blowing agents.

Expandable materials that are also suitable are sold by Sika Corp., USA, for example under the SikaBaffle® 240, SikaBaffle® 250 or SikaBaffle® 255 trade name, and are described in patents U.S. Pat. Nos. 5,266,133 and 5,373,027. Such expandable materials are particularly preferred for the present invention.

Preferred expandable materials having reinforcing properties are, for example, those which are sold under the SikaReinforcer® 941 trade name by Sika Corp., USA. These are described in U.S. Pat. No. 6,387,470.

In one exemplary embodiment, the expandable material has an expansion rate of 800% to 5000%, preferably of 1000% to 4000%, more preferably of 1500% to 3000%. Expandable materials having such expansion rates offer the advantage that, as a result, reliable sealing or sealing-off of the structural element with respect to liquids and sound can be achieved.

In one exemplary embodiment, the expandable material is in the form of a temperature-stimulated material.

This has the advantage that, as a result, the furnace for baking the dipcoating liquid can be used to expand the expandable material and hence to seal off the cavity. Consequently, no additional working step is required.

The carrier may consist of any desired materials. Preferred materials are plastics, especially polyurethanes, polyamides, polyesters and polyolefins, preferably polymers which can withstand high temperatures such as poly (phenylene ethers), polysulfones or polyether sulfones, which in particular are also foamed; metals, especially aluminium and steel; or grown organic materials, especially wood materials or other (densified) fibrous materials, or vitreous or ceramic materials; especially also foamed materials of this type; or any desired combinations of these materials. Particular preference is given to using polyamide, especially nylon-6, nylon-6,6, nylon-11, nylon-12 or a mixture thereof.

Furthermore, the carrier may be solid, hollow or foamed or have a meshlike structure, for example. Typically, the surface of the carrier can be smooth, rough or structured.

In the case of insulating elements in which the expandable material is located on a carrier, the production process differs according to whether the carrier consists or does not consist of a material that can be processed by injection molding. If this is the case, a two-component injection molding process is typically used. This involves first injecting a first component, in this case the carrier. After said first component has solidified, the cavity in the mold is enlarged, or adapted, or the molding produced is placed into a new mold, and a second component, in this case the expandable material, is overmolded onto the first component by a second injection apparatus.

If the carrier consists of a material that cannot be produced by the injection molding process, i.e., for example, consists of a metal, the carrier is placed into a corresponding mold and the expandable material is overmolded onto the carrier. Of course, it is also possible to fasten the expandable material to the carrier by specific fastening means or processes.

Furthermore, carriers can also be produced by other processes, for example by extrusion.

In one exemplary embodiment, the robot comprises a multi-articulated robot arm and only one gripper arranged thereon.

In one exemplary development, the robot comprises multiple grippers. The robot is designed in such a way that it can use each gripper to remove an individual insulating element from the stack and arrange it on structural elements.

This gripper may be designed in various ways.

For example, the gripper may comprise a suction gripper and/or a parallel gripper and/or an expansion gripper.

In one exemplary embodiment, the gripper is designed to grip a plurality of different types of insulating elements.

In one exemplary embodiment, the gripper has at least two engaging elements which are designed to be fitted into corresponding engaging elements on the insulating elements.

These engaging elements on the insulating elements and on the gripper of the robot may be configured in different ways.

For example, the engaging elements on the insulating element may take the form of hoods or depressions, and the corresponding engaging elements on the gripper may have a complementary design.

Or else the insulating elements on the gripper may take the form of holes or elongated holes of different size, for example, and the engaging elements on the insulating element may have a conical design, for example.

The engaging elements on the insulating elements may additionally take the form, for example, of steps, edges or fins.

In one exemplary development, these at least two engaging elements of the gripper are of different design.

A different design of the engaging elements has the advantage that it is possible thereby to unambiguously fix an alignment of the insulating elements on the gripper, such that the insulating elements cannot be gripped when rotated by 180°. It is thus possible to avoid incorrect manipulations by the robot.

Figure 2A:
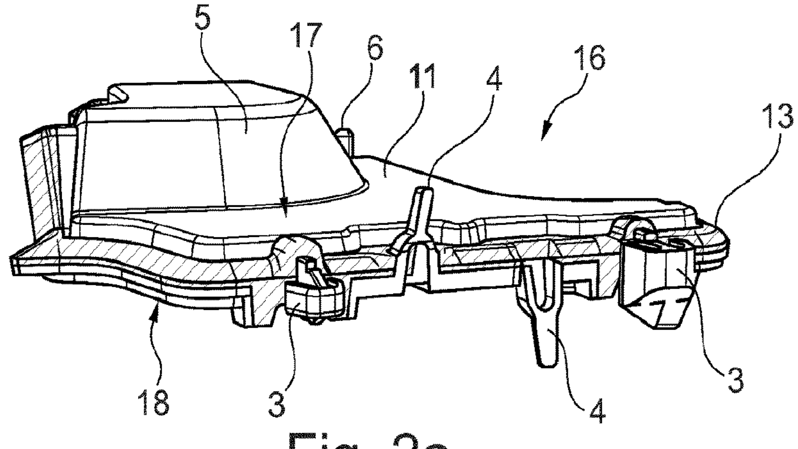
FIGS. 2*a* to 2*c* show a schematic representation of an exemplary insulating element or of a stack with a plurality of such insulating elements.

Firstly, FIG. 2*a* illustrates an individual insulating element 16. This insulating element 16 has a carrier 11 and an expandable material 13 arranged on this carrier 11. The insulating element 16 has a substantially flat form in order to be able to efficiently seal off a cross section of a structural element in a state of use. In this case, however, the insulating element 16 does not have a completely flat form, but rather has various elevations and step-shaped shoulders, in particular one steep step 5.

The insulating element 16 has a top side 17 and a bottom side 18 here. In addition, the insulating element 16 in this exemplary embodiment has two fixing elements 3 and two spacer elements 4, which are each oriented on different sides.

Moreover, the insulating element 16 has a support element 6 which, in this exemplary embodiment, is arranged on the top side 17 of the insulating element 16.

In this exemplary embodiment, the insulating element 16 has three contact sites arranged on the top side 17, and three respectively assigned contact sites on the bottom side 18. Two respective contact sites are arranged here in the regions of the fixing elements 3, and a further contact site takes the form of a support element 6 or a support point on the bottom side 18 of the insulating element 16.

Figure 2B:
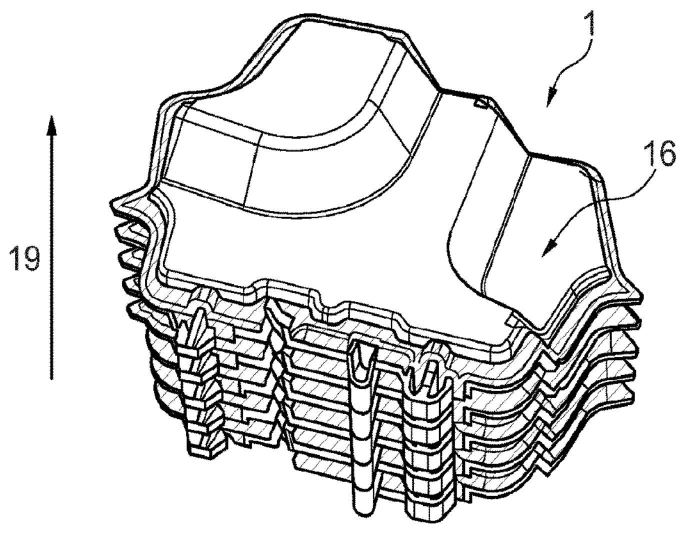

FIG. 2*b* now illustrates a stack 1 having a plurality of insulating elements 16 according to FIG. 2*a*. The insulating elements 16 are stacked here one on top of another in a stacking direction 19. The stacked insulating elements 16 are arranged here parallel to one another and each lie one on top of another at the contact sites on their top side and bottom side. The insulating elements 16 are oriented substantially identically in space.

Figure 2C:
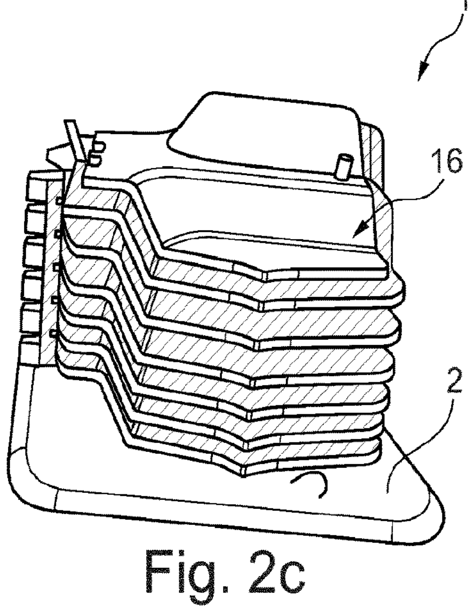

FIG. 2*c* in turn illustrates a stack 1 having stacked insulating elements 16, with the lowermost insulating element 16 of the stack 1 being arranged on a base element 2 in this exemplary embodiment.

Figure 3:
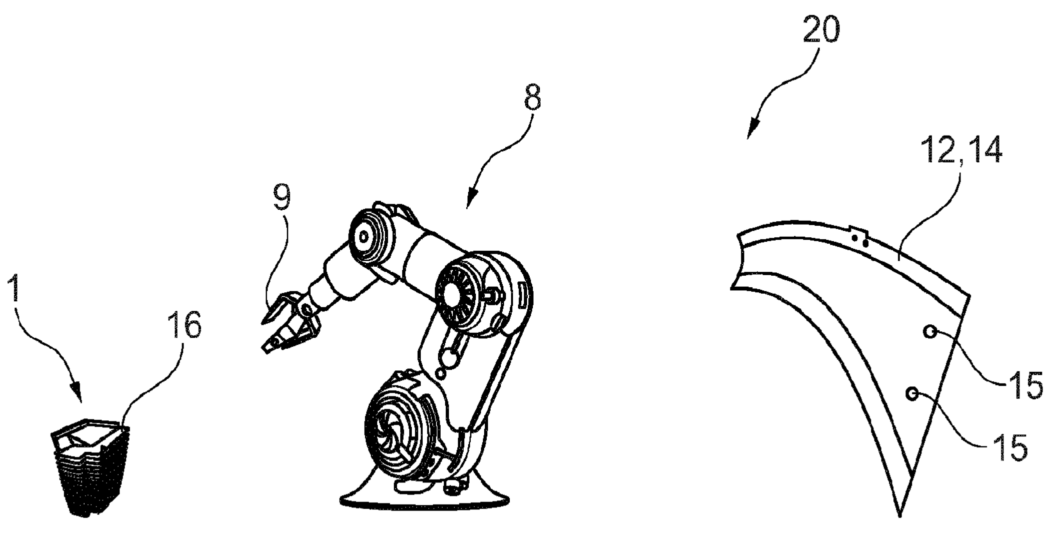
FIG. 3 shows a schematic representation of a system for carrying out an automated mounting method.

In FIG. 3, a system 20 for mounting insulating elements 16 on structural elements 12, 14 is shown schematically. In this exemplary embodiment, a stack 1 with insulating elements 16 is provided. The robot 8, which is designed as a multi-axis robot with a gripper 9, mounts the individual insulating elements 16 on a structural element 12, 14, which is designed as a single sheet in this exemplary embodiment.

Figure 4:
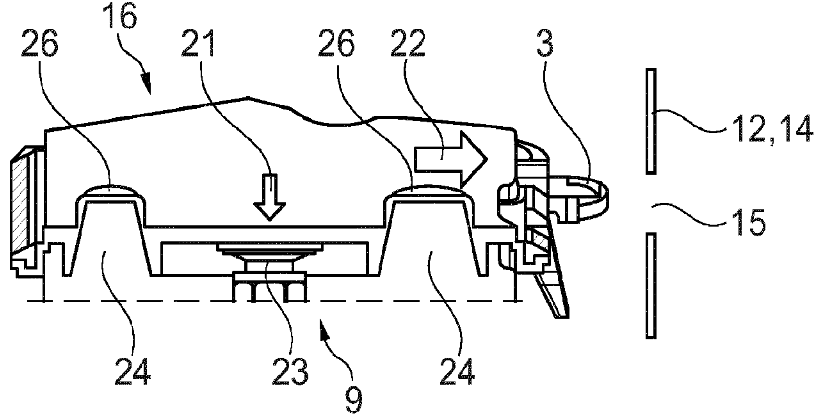
FIG. 4 shows a schematic representation of an exemplary gripper with an insulating element arranged thereon.

FIG. 4 now shows, in exemplary and schematic form, the mounting of an insulating element 16 by the robot on a structural element 12, 14. The robot here pushes the insulating element 16 in the application direction 22 against the structural element 12, 14 such that the fixing element 3 is introduced into the opening 15 of the structural element 12, 14 and is mechanically locked therein. In this exemplary embodiment, the gripping direction 21 and the application direction 22 form substantially an angle of 90° during the mounting of the insulating element 16 on the structural element 12, 14.

In this exemplary embodiment, the gripper 9 comprises a suction gripper 23 that can move an insulating element 16 by suction in a gripping direction 21. For better fixing of the insulating element 16 on the gripper 9, various engaging elements 24, 26 are additionally provided, which intermesh and mechanically lock the insulating element 16 and the gripper 9 to prevent lateral movement.

In FIGS. 5*a* to 5*c*, various possible embodiments of fixing elements 3 are shown schematically and by way of example. The fixing element 3 in FIGS. 5*a* and 5*b* in each case comprises a guide element 7 which is arranged at one end of the fixing element 3 in the application direction. A height of the guide element 7 in the application direction 22 is denoted as D1. The guide element 7 in FIG. 5*a* is designed in the shape of a cylinder, and the guide element 7 in FIG. 5*b* is designed in the shape of a cone. Of course, many other shapes for the guide element 7 are conceivable.

A structural height of the fixing element 3, which height protrudes beyond the structural element 12, 14 in the application direction 22 in a mounted state, is denoted by D2 in FIG. 5*b*. It is often advantageous to keep such a structural height as small as possible because the space conditions in vehicle bodies are limited. Thus, preferably flat and rather wide fixing elements 3 can be used, as shown in FIG. 5*b*.

In FIG. 5*c* an asymmetrical fixing element 3 is shown schematically and by way of example. A first half of the fixing element 3 is higher by a height D3 in the application direction 22 than a second half of the fixing element 3. Such an asymmetrical formation with a step can be used in a manner similar to the guide element 7 from FIGS. 5*a* and 5*b* to simplify the operation of inserting the fixing element 3 into the opening 15 of the structural element.

In FIGS. 6*a* and 6*b*, a test operation during the automated mounting of insulating elements 16 on structural elements 12, 14 is shown schematically and by way of example. In FIG. 6*a*, the fixing element 3 is inserted into the opening 15 of the structural element 12, 14. In this exemplary embodiment, the fixing element 3 is designed as a type of snap closure. The insulating element 16 is moved in the application direction 22 by the robot. In this exemplary embodiment, the application direction 22 runs substantially in only one direction and perpendicular to a surface of the structural element 12, 14 in a region of the opening 15.

However, in an alternative exemplary embodiment that is not shown, the application direction 22 can also run at an inclination to this vertical, and/or from a plurality of different directions, and/or in the form of an arc, etc.

A check of the correct mounting of the insulating element 16 on the structural element 12, 14 is shown schematically in FIG. 6*b*. The robot loads the insulating element 16 in at least one testing direction 25. This testing direction 25 can be applied, for example, in a direction which is at least 45° inclined from the application direction 22, or such a testing direction 25 can additionally or alternatively also be implemented as a rotational movement, which substantially corresponds to a rotation of the insulating element 16 about its own axis.

In a particularly advantageous manner, when checking that the insulating element 16 is correctly mounted on the structural element 12, 14, loading is carried out in at least two testing directions 25. In this way, correct mounting can be ensured with great reliability.

Figure 7A:
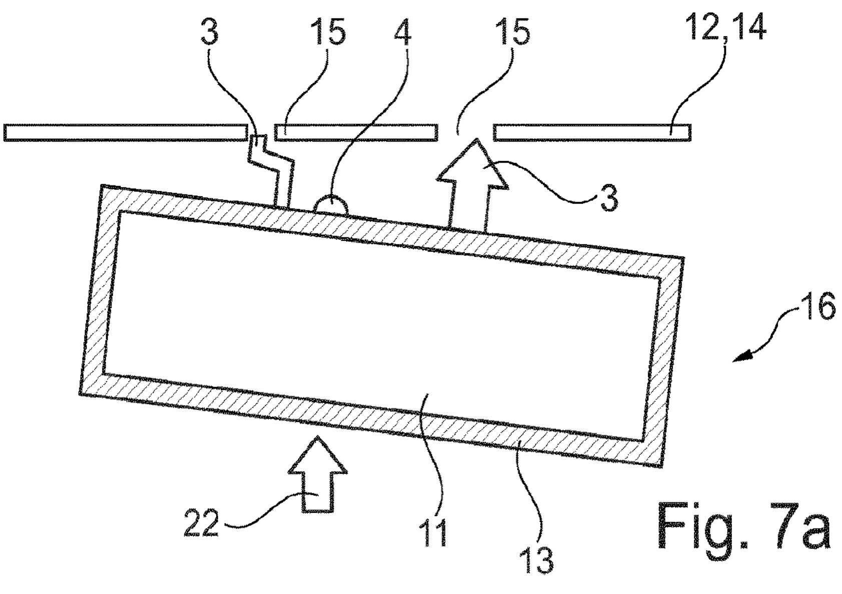
FIGS. 7*a* to 7*c* show a schematic representation of an exemplary automated mounting operation.
Figure 7B:
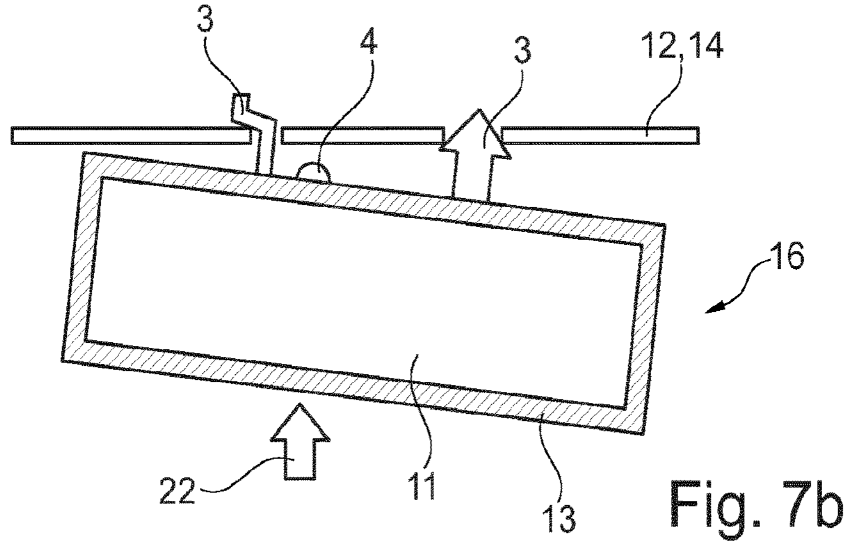
Figure 7C:
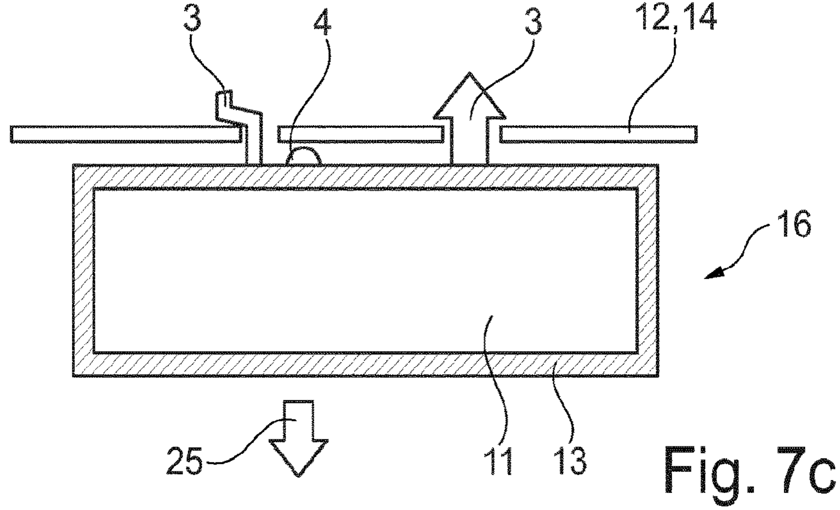

In FIGS. 7*a* to 7*c*, another example of automated mounting of an insulating element 16 on a structural element 12, 14 is shown schematically and by way of example. In this case, the insulating element 16 is first mounted on the structural element 12, 14 in that two fixing elements 3 are each inserted and latched into an opening 15 of the structural element 12, 14. In this exemplary embodiment, one of the fixing elements is designed as a hook and a second fixing element 3 is designed as a clip. In this case, the insulating element 16 also comprises a spacer element 4 which, when mounting has taken place, ensures that the body of the insulating element 16 is at an intended distance from the structural element 12, 14. After mounting has taken place, which takes place in the application direction 22, the mounting is tested in a checking step. In this case, the insulating element 16 is loaded by the robot in the testing direction 25, with in this case the testing direction 25 running substantially counter to the application direction 22.

LIST OF REFERENCE SIGNS

1 Stack
2 Base element
3 Fixing element
4 Spacer element
5 Step
6 Support element
7 Guide element
8 Robot
9 Gripper
10 Vehicle body
11 Carrier
12 Structural element
13 Expandable material
14 Structural element
15 Opening
16 Insulating element
17 Top side
18 Bottom side
19 Stacking direction
20 System
21 Gripping direction
22 Application direction
23 Suction gripper
24 Engaging element
25 Testing direction
26 Engaging element
D1 Height of the guide element
D2 Structural height of the fixing element
D3 Height difference of asymmetrical fixing element

The invention claimed is:

1. A method for an automated mounting of insulating elements on structural elements of motor vehicles, the method comprising the steps of:

providing a plurality of insulating elements, wherein an insulating element in each case comprises a carrier, an expandable material which is arranged on the carrier, and at least one fixing element for fixing the insulating element on the structural element;

gripping individual insulating elements by a robot, wherein the robot is designed as a multi-axis robot with a gripper; and mounting in each case an insulating element on a structural element by the robot, wherein the at least one fixing element of the insulating element is inserted into an opening in the structural element.

2. The method as claimed in claim 1, wherein the insulating elements are provided in a stack when they are provided, all the insulating elements stacked on top of one another being oriented substantially identically in space.

3. The method as claimed in claim 1, wherein the robot moves the insulating element in at least two different application directions when inserting the fixing element into the opening.

4. The method as claimed in claim 1, wherein the method comprises the further step of:

testing that the insulating element is correctly mounted on the structural element, in that the robot loads the insulating element in at least one testing direction which is inclined by at least 45° from an application direction, and/or in that the robot loads the insulating element in at least one testing direction which substantially corresponds to a direction of rotation of the insulating element.

5. The method as claimed in claim 4, wherein the robot loads the insulating element in at least two different testing directions during testing.

6. The method as claimed in claim 4, wherein during testing a force of at least 5 N and/or at most 200 N is applied by the robot to the mounted insulating element.

7. The method as claimed in claim 4, wherein the method comprises the further step of:

sorting out the insulating element if the insulating element is detached from the structural element during testing.

8. The method as claimed in claim 7, wherein the method comprises the further step of:

interrupting the automated operation if three or more insulating elements out of ten insulating elements mounted one after the other are each detached from the structural element during testing.

9. The method as claimed in claim 1, wherein the robot applies a force of at least 70 N to the fixing element during mounting.

10. An insulating element for sealing off a structural element in a motor vehicle, the insulating element comprising:

a carrier;

an expandable material which is arranged on the carrier; and at least one fixing element for fixing the insulating element on the structural element;

wherein the insulating element is designed for automated mounting as claimed in claim 1.

11. The insulating element as claimed in claim 10, wherein the fixing element has a guide element which is designed as an extension at one end of the fixing element in an intended application direction.

12. The insulating element as claimed in claim 11, wherein the guide element has a height in the application direction of between 0.5 and 5 mm.

13. The insulating element as claimed in claim 10, wherein the insulating element comprises at least two fixing elements, and wherein at least one of these fixing elements is designed as a fastening clip with a snap closure.

14. The insulating element as claimed in claim 10, wherein a height of the fixing element in the application direction, which increases over the structural element in a mounted state, is at most 5 mm.

15. The insulating element as claimed in claim 10, wherein the fixing element is of asymmetrical design, with a first half of the fixing element being designed to be higher by a height in the application direction than a second half of the fixing element.

* * * * *